United States Patent [19]

Gendler et al.

[11] Patent Number: 4,781,758

[45] Date of Patent: Nov. 1, 1988

[54] INK COMPOSITION FOR DROP-ON-DEMAND INK JET

[75] Inventors: Paul L. Gendler; Alfred H. Sporer, both of San Jose, Calif.; Donald A. Stremel, Northglenn, Colo.

[73] Assignee: International Business Machines Corporation, Armonk, N.Y.

[21] Appl. No.: 111,225

[22] Filed: Oct. 22, 1987

[51] Int. Cl.$^4$ .............................................. C09D 11/02
[52] U.S. Cl. ......................................... 106/22; 106/20
[58] Field of Search ................................... 106/20, 22

[56] References Cited

U.S. PATENT DOCUMENTS

| | | | |
|---|---|---|---|
| 3,429,825 | 2/1969 | Voedisch | 252/301.2 |
| 3,705,043 | 12/1972 | Zabiak | 106/20 |
| 3,846,141 | 11/1974 | Ostegren et al. | 106/22 |
| 4,153,593 | 5/1979 | Zabiak | 260/29.6 ME |
| 4,184,881 | 1/1980 | Bradley | 106/20 |
| 4,239,543 | 12/1980 | Beasley | 106/22 |
| 4,455,168 | 6/1984 | Shimada et al. | 106/22 |

OTHER PUBLICATIONS

Derwent Abstract Accession No. 81-74848D/41, Japanese Pat. No. J56109264, Aug. 29, 1981.
Advances in Colloid & Interface Science, 25, pp. 89-200 (1986), Table VI, p. 154.

*Primary Examiner*—Amelia Burgess Yarbrough
*Attorney, Agent, or Firm*—Joseph G. Walsh

[57] ABSTRACT

A substantially aqueous composition for drop on demand ink jet printing comprising a fluid vehicle with greater than 50% by weight water, a water soluble dye in the range of 1-10% by weight, a lower alkylene glycol plasticizer in the range of concentration of 1-20% by weight, and in the range of 1-10% by weight, a water soluble additive which is a low molecular weight heterocyclic, bifunctional monomer or dimer in which the two functional groups are either two imide groups, or a hydantoin bearing a carboxylic acid group, with both the imide groups and the amide groups being capped with hydroxyalkylene units.

9 Claims, No Drawings

INK COMPOSITION FOR DROP-ON-DEMAND INK JET

DESCRIPTION

Technical Field

This invention relates to ink compositions for drop-on-demand (DOD) ink jet printing. More specifically, it relates to ink additives for prevention of nozzle failures in DOD printing. Further, this invention relates to additives to DOD ink compositions in which the fluid contains more than 50% water.

Background Art

In continuous ink jet (CIJ) printing ink fluid compositions contain a high proportion of water because good print quality is thereby obtainable on a wide range of office papers (WROP). In drop-on-demand (DOD) ink jet printing the problem that results from the use of fluids with a a high proportion of water is that the water evaporates during the dormancy period of the ink in the very fine ink jet nozzles which results in precipitation of components in the ink with resultant nozzle clogging. In CIJ systems there is no dormancy period of the nozzle even when the printer is not printing because during print dormancy the jet is continuously ejecting ink into a gutter. On start-up after shutdown, external pressure is applied to the ink which ejects any plugs or precipitates in the nozzle. In DOD printing there is no source of external pressure to clear plugs or clogs in the nozzles. The only pressure is that supplied by the printhead pulse generator, which is much lower than that obtainable in CIJ.

In the present DOD state-of-the-art the solution to this problem is to prepare an ink with a high proportion of non-volatile liquid, miscible with water in all proportions, and which is a solvent for the ink colorant. By adjusting the ratio of non-volatile liquid to water the evaporation rate of water is reduced and the colorant remains dissolved even as the fluid ratio changes so that precipitation of colorant no longer causes nozzle clogging failure. The generally preferred fluid compositions for reduced nozzle clogging failures in DOD printing are those whose water content is less than 50%. While fluid compositions with less than 50% water are preferred for reducing nozzle clogging they are not preferred for print quality or for dry time on WROP. Instead, DOD ink jet printers utilizing the state-of-the-art ink compositions must provide special papers for those ink jet printers to obtain reasonable print quality and acceptable dry time. The problem, therefore, is that within the present DOD state-of-the-art one must make a trade-off between an ink composition with low nozzle clog failure and one with good print quality on WROP.

U.S. Pat. No. 3,705,043 to Zabiak describes an aqueous ink composition suitable for use in CIJ printing which comprises carbon black and 5–30% by weight of a non-volatile, water miscible fluid selected from the group consisting of the lower alkylene glycols and alkyl ethers of the lower alkylene glycols. U.S. Pat. No. 3,846,141 to Ostergren and Zabiak describes an aqueous ink composition for use in CIJ printing which comprises 5–40% by weight of a non-volatile, water miscible fluid selected from the group of lower alkoxy glycols and at least one compound selected from the group consisting of polyethylene glycol, polypropylene glycol, a lower alkyl ether of ethylene glycol, diethylene glycol, propylene glycol and glycerol. U.S. Pat. No. 4,239,543 to Beasley, teaches a method for preparing aqueous ink compositions with improved tip-dry characteristics and improved anti-gassing characteristics for use in either CIJ or DOD printing. The patent claims the use of the lower alkylene glycols, such as ethylene and propylene glycols, as the water miscible, non-volatile fluid. Fluid compositions in the range of 20–97% glycol are claimed through all the examples and the 'preferred' fluid compositions are in the range of 50–90%. The higher concentrations of glycols are clearly preferred because of their importance in reducing nozzle clogging. U.S. Pat. No. 4,153,593 to Zabiak and Hwang teaches the use of fluorescent dyes in an aqueous ink composition for a CIJ printer. The patent discloses a list of water soluble, film-forming, low to medium molecular weight resins, including a hydantoin-formaldehyde resin, DMHF, to an ink composition to act as a film binder of the fluorescent dye on any substrate. The resin films were selected because they do not interfere with the subsequent fluorescence of the dye. This patent refers to the addition of 2–30% by weight of non-volatile, water-miscible humectants such as the lower alkylene glycols, etc. as described in U.S. Pat. No. 3,705,043.

Despite the claims of the above patents regarding the effectiveness of the disclosed alkylene glycols and ethers there continues to be efforts to find more effective additives which would result in improved nozzle maintenance with lower concentrations of the non-volatile, water miscible component. The reasons are that the dry time of the ink increases, the viscosity increases and the print quality deteriorates. For example, U.S. Pat. No. 4,184,881 teaches the addition of 14% by weight of Surfynol 489 "which substantially prevents tip-drying of the ink in the nozzle" in CIJ printing. U.S. Pat. No. 4,455,168 discloses the addition of 5% of an amino-containing propylene glycol with 5% glycerin and 10% diethylene glycol "which does not result in plugging of the nozzle" in CIJ printing.

An object of our invention is to disclose a class of materials which can be added to aqueous ink compositions for DOD jet printing which are more efficient than the lower alkylene glycols, etc. in improving nozzle clogging which thereby permits formulating ink compositions with sufficiently high water content for good DOD print quality on WROP and without suffering the trade-off of nozzle clog failures in DOD printing. We disclose the discovery of a class of highly water soluble additives which are 3–5 times more efficient than the lower alkylene glycols in reducing water evaporation rates, the primary cause of nozzle clog failures.

Without necessarily restricting ourselves to the following explanation we believe that our additives work by reducing the evaporation rate of water by formation of an in situ film or membrane on the surface of the ink in the nozzle. The film or membrane acts as a physicochemical cap at the nozzle surface during the dormancy period when the ink is in the nozzle. The cap reduces the evaporation rate of water to that which is conventionally obtained by admixture of high proportions of non-volatile, water miscible fluids.

Many materials are known which when added to water reduce their evaporation rate. There are known, very slightly soluble, surface active additives which form a monalayer on the surface of the water which reduces its evaporation rate. An excellent review of materials that perform in this manner is given in *Advances of Colloid and Interface Science*, 25, pp. 89–200, (1986). In Table VI, p. 154 of that article is listed a large number of these compounds. In general, the compounds are materials with a polar end group and a non-polar tail such as the higher alkyl acids, alcohols, and selected esters. The use of these additives in inks usually presents a problem of one sort or another.

Water soluble polymers are another class of additives that reduce the evaporation rate of water. Unfortunately, in DOD printing they also cause nozzle clog failures. Water soluble polymers are generally added to ink compositions to impart the desired viscosity or the desired film forming characteristics to the ink. The reduction in evaporation rate is only an incidental characteristic of polymer addition for CIJ inks because, as previously explained, the evaporation rate of water is a lesser concern in CIJ printing. In DOD printing there is much greater sensitivity between the thickening and film forming properties of polymers, on the one hand, and failure of the ink in the nozzle. While these polymers reduce the evaporation rate of water they also form a viscous plug in the nozzle. At the molecular weights generally useful for thickening solutions or for film formation, this plug is generally too viscous for it to be ejected from the nozzle by the low force supplied by the DOD pressure pulse generator. Only in CIJ ink systems is there sufficient pressure applied to eject such viscous plugs at start-up. As mentioned previously, in CIJ jet systems there is no dormancy period of the nozzle even when the printer is not printing because during print dormancy the jet is continuously ejecting ink into a gutter.

DISCLOSURE OF THE INVENTION

Our discovery is that certain low molecular weight materials can be used to reduce the evaporation rate of water. During the dormancy period of the ink in the nozzle these materials form a film or membrane at the surface of the nozzle as the water evaporates. The materials we have found also satisfy an additional requirement for preventing nozzle clog failure in DOD printing which is that the film is weak enough to be rupturable by the low pressure pulse of a DOD printhead. To be rupturable at low pressure after long dormancy times the molecular weight of the desired water soluble additives must be low enough to permit back diffusion such that the steady state thickness of the film remains relatively thin and rupturable. We have also found that the dye itself becomes incorporated in the film and alters its rupture yield point. To maintain a low rupture yield point we have found it useful to add water miscible alkylene glycols to the fluid. These glycol additives are known in the art to reduce the evaporation rate of water but when mixed with our additives the alkylene glycols plasticize the resulting membrane which lowers the rupture yield point but at the expense of increasing the rate of evaporation of water.

An additive we have discovered for prevention of nozzle clogging in DOD printing is a dimer of 5,5-dimethylhydantoin-formaldehyde resin DMHF. This resin is among those listed in U.S. Pat. No. 4,153,593 to Zabiak and Hwang. The referenced patent teaches the use of low-to-medium molecular weight water soluble polymers or resins with fluorescent dyes in CIJ printing as film forming additives. Polymers or resins such as the poly(alkylene glycols), polyvinyl alcohols, polyhydroxyalkyleneimines and a number of others, including the hydantoin-formaldehyde resin, DMHF, are listed. These polymers are selected for their film-forming properties without interference with the fluorescence of their fluorescent dyes. The higher molecular weight components of, for example, the hydantoin-formaldehyde resin, are preferred for formation of good fluorescent films. As previously mentioned, these higher molecular weight polymeric additives pose a lesser nozzle maintenance problem in CIJ printing than in DOD printing and therefore the teachings in the Zabiak and Hwang patent makes no note of any differences among them upon maintenance in their CIJ printer. In the case of our invention the low molecular dimers of DMHF are preferred precisely because they form a weak film. In fact, the films formed by the commercially available mixture of low and high molecular weight oligomers of the hydantoin-formaldehyde resin require the addition of glycols to plasticize and weaken them. As further proof that the effective components of DMHF are the dimers, we find that if we heat the commercially available hydantoin-formaldehyde resin we enhance the high molecular weight components relative to the low molecular weight dimers and we lose its effectiveness as a nozzle clog prevention additive.

As additional proof of the importance of the low molecular weight dimer oligomers of the hydantoin-formaldehyde resin we have demonstrated monomers and dimers of other materials of similar structure to be useful in our invention. What we have discovered is certain additives are 3–5 times more effective than glycols in reducing the evaporation rate of water. These additives are low molecular weight heterocyclic, bifunctional monomers or dimers in which the two functional groups are either two imide groups, or a hydantoin bearing a carboxylic acid group, with both the imide groups and the amide groups being capped with hydroxyalkylene units. Examples of structures which satisfy those requirements are: 1,1'(1,1-ethylidene)bishydantoin (HA), alloxan (ALX) and 5-hydantoinacetic acid (HAA). (It is believed that in use alloxan undergoes rearrangement to alloxanic acid.)

Examples of end-capping structures which are useful are: formaldehyde (F), glyoxal (G) and glyoxylic acid (GA).

This is not an exhaustive list of possible materials. These examples are given as illustration and not to be construed as limitations on the present invention. Persons versed in the chemical arts will recognize other possibilities.

The film forming additive is present in the ink at about 1–10% by weight. A lower alkylene glycol plasticizer, preferably ethylene glycol is present at about 1–20% by weight. A water soluble dye, for example, nigrosin, Food Black 2, Direct Black 2, Direct Black 163, or Mobay Special Black SP Liquid, is present at about 1–10% weight. The balance of the ink is water, although other optional ingredients such as biocides, buffers, dye solubilizers, and foam suppressors may also be present, if desired.

That these materials reduce the evaporation rate of water is shown in the following examples:

EXAMPLE 1

5,5-dimethylhydantoin-formaldehyde (DMHF)

A 0.5 mm id × 32 mm long capillary was nearly filled with the test solution. One end of the capillary was sealed with hexadecane, a non-volatile liquid completely insoluble in water solutions. The capillary was then mounted vertically on a microbalance such that the unsealed end was at the bottom. In this position, gravitational force maintains the water solution at the front of the capillary during evaporation. The weight of capillary was measured within the first minute after mounting and the weight loss was recorded periodically thereafter over a period of at least 6 hours. During the run the humidity was in the range of 50–55% and the temperature was 21 degrees C. Deionized water evaporated at a constant rate. The addition of DMHF caused the evaporation rate of water to decrease with time and this decrease was accelerated with increasing amounts of DMHF. The change in evaporation rate is explained by the buildup of a thicker film at the capillary opening with time of evaporation. 9 wt. % DMHF is close to that of 50 wt. % EG.

EXAMPLE 2 alloxan/glyoxylic acid (ALX/GA)

Same setup and conditions as in Example 1. 6 wt. % ALX/GA is equivalent to 20 wt. % EG in reducing the evaporation rate of water 6×.

EXAMPLE 3 ethylene glycol

Same setup and conditions as in Example 1. This is the conventional additive for reduction of water evaporation by the addition of a non-volatile, water miscible fluid. The effectiveness in reducing the evaporation rate of water by 20% EG is about the same as 6% DMHF, and 50 wt. % EG is about the same as 9 wt. % DMHF. DMHF is therefore 3–5× more effective than EG in this regard.

EXAMPLE 4

1,1'(1,1 ethylidene)bishydantoin/glyoxylic acid (HA/GA)

Same setup and conditions as in Example 1. Once again 6% HA/GA is as effective as 20% EG in reduction of the evaporation rate of water.

EXAMPLE 5

5-hydantoinacetic acid/glyoxylic acid (HAA/GA)

Same setup and conditions as in Example 1. Here too 6% HAA/GA is shown to be as effective as 20% EG.

EXAMPLE 6 nozzle maintenance of an ink in a Hewlett-Parkard (HP) ThinkJet (trademark) printer An HP ThinkJet printer was used as a test vehicle. The ThinkJet printer was programmed to print a few lines consisting of character boxes made up of a 9×6 array of spots and then to remain dormant for controlled lengths of time from a dormancy of a few seconds to 24 hours from the end of printing the last line to the beginning of printing the next line. (The periodic 'splitting' mechanism on the HP printer was avoided by omitting the descender nozzles from the test). The ink in the HP ThinkJet cartridge was removed from the cartridge and replaced with the test ink. The maintenance of the test ink was measured by counting the number of print pulses required before eight-out-of-nine nozzles were printing. The more pulses required after a given dormancy period the lower is the maintenance rating of the ink.

The following test inks were prepared and tested in the printer:
1. 5 wt. % Direct Black 163; 5 wt. % ethylene glycol in water;
2. 5 wt. % Direct Black 163; 6 wt. % DMHF in water;
3. 5 wt. % Direct Black 163; 5 wt. % ethylene glycol; 6 wt. % DMHF.

The test results are as follows:
(Ink 1) required 40,000 pulses after a dormancy period of 8 hours and failed at the 16 hour dormancy period.
(Ink 2) required 5,000 pulses after 8 hours and 45,000 pulses after 16 hours. It failed at the 24 hour dormancy period.
(Ink 3) required the same number of pulses after 8 and 16 hour dormancy periods but did not fail at the 24 hour dormancy period and only required 8,000 pulses after that time.

We claim:

1. A substantially aqueous composition for drop on demand ink jet printing comprising:

a fluid vehicle with greater than 50% by weight water, a water soluble dye in the range of 1–10% by weight, a lower alkylene glycol plasticizer in the range of concentration of 1–20% by weight, and in the range of 1–10% by weight, a water soluble additive which is a low molecular weight heterocyclic, bifunctional monomer or dimer in which the two functional groups are either two imide groups, or a hydantoin bearing a carboxylic acid group, with both the imide groups and the amide groups being capped with hydroxyalkylene units.

2. An ink composition as claimed in claim 1 wherein the additive is a dimer of 5,5-dimethylhydantoin-formaldehyde.

3. An ink composition as claimed in claim 1 wherein the additive is formed from alloxan and glyoxylic acid.

4. An ink composition as claimed in claim 1 wherein the additive is formed from 1,1'(1,1 ethylidene)bishydantoin and glyoxylic acid.

5. An ink composition as claimed in claim 1 wherein the plasticizer is ethylene glycol.

6. An ink composition as claimed in claim 1 wherein the dye is water soluble nigrosin.

7. An ink composition as claimed in claim 1 wherein the dye is Food Black 2.

8. An ink composition as claimed in claim 1 wherein the dye is Direct Black 163.

9. An ink composition as claimed in claim 1 wherein the dye is Mobay Special Black SP Liquid.

* * * * *